Jan. 21, 1958    W. E. BELKE    2,820,549
FILTERS
Filed April 18, 1955    7 Sheets-Sheet 1

Fig. 1

INVENTOR:
William E. Belke
by Robert H. Wendt
Attorney

Jan. 21, 1958    W. E. BELKE    2,820,549
FILTERS
Filed April 18, 1955    7 Sheets-Sheet 2

Fig. 2

INVENTOR:
William E. Belke
by Robert H. Wendt
Attorney

W. E. BELKE 2,820,549

FILTERS

Filed April 18, 1955

INVENTOR:
William E. Belke
by Robert H. Wendt
Attorney

United States Patent Office 2,820,549
Patented Jan. 21, 1958.

2,820,549
FILTERS

William E. Belke, Chicago, Ill., assignor to Belke Manufacturing Co., Chicago, Ill., a corporation of Illinois Application April 18, 1955, Serial No. 501,885

6 Claims. (Cl. 210—297)

The present invention relates to filters, and is particularly concerned with filters adapted to filter the electrolyte used in electroplating, but the present filters are also capable of general use and application.

One of the objects of the present invention is the provision of an improved filter for electrolyte which is adapted to be operated continuously instead of requiring cleaning daily, and in which the residue or solids may be removed while the filter is operating.

The electrolyte filters of the prior art require cleaning every night, which consumes from three to four hours and results in the waste of the electrolyte solutions in amounts which may, for example, cost twenty-seven dollars for a certain filter of standard size; and also involves three to four hours labor and the use of new clean filter pads.

Another object of the invention is the elimination of this waste of electrolyte and the elimination of the labor involved in daily cleaning, and the provision of improved filters which may be operated substantially continuously, and in which the filter element is cleaned or scraped continuously and the residue or muck filtered from the liquid is discharged at will from the bottom of the filter housing.

Another object of the invention is the provision of an improved filter which may be provided with a filter element in the form of a string, cord, or thread of fibrous construction, which is located in a tapered spiral groove on a cylinder, and which is drawn tightly into the tapered groove so that liquid cannot pass between the filter element and the walls of the groove, but must pass through the filter element, the groove having a multiplicity of discharge apertures at its base.

Another object of the invention is the provision of an improved filter construction including a cylinder provided with a filter element on its periphery for passing the filtrate from the outside to the inside of the cylinder, and in which the cylinder is rotated slowly and engaged by a long scraper blade that is adapted to clean the residue from the surface of the filter down to a certain level, which may be the level of the filter and powder that is applied to the drum for improving the characteristics of the filter element, thereby maintaining the filter element in uniform condition to pass and filter the liquid.

Another object of the invention is the provision of an improved continuous filter which is so arranged that the liquid to be filtered is uniformly distributed over a drum which supports the filtering element, and in which the liquid is operated at a high pressure as distinguished from mere gravity flow, so that the filtering may be expedited and carried on more efficiently since the high pressure is adapted to force the liquid to be filtered through filter elements that resist the flow, but are also adapted to remove substantially all residue.

Another object of the invention is the provision of an improved filter construction which is unlimited in size or amount of filter area, and in which the construction is such that when the filter is stopped and permitted to stand for a short time, the liquid is kept in the filter housing covering the entire drum and filter elements so that the residue remaining thereon does not become dry, set or hard on the drum or in the bottom of the residue chamber.

Another object of the invention is the provision of an improved continuous filter, in which the residue is continuously removed at will, but in which the filter element is also adapted to be cleaned by reverse flow or by the use of water nozzles playing on the filter element on the drum, and removing substantially all residue when necessary.

Other objects and advantages of the invention will be apparent from the following description and the accompanying drawings, in which similar characters of reference indicate similar parts throughout the several views.

Referring to the five sheets of drawings accompanying the specification.

Referring to Figs. 1 to 5, 20 indicates a supporting frame for the filter housing 21, which is preferably mounted on caster supported wheels 22 in the smaller sizes.

The frame 20 may comprise four legs 23, made of angle iron, the legs being bolted or riveted at the bottom to a rectangular base 24, consisting of four channeled members 25, secured together at the corners of the rectangular frame or base 24 by bolts or rivets 26, securing the base 24 to the legs 23.

At their upper ends the legs 23 carry curved, partially cylindrical supporting pads 27, located under the curved ribs 28, carried by the housing 21 on its cylindrical side wall 29.

Pads 27 are welded to the angle irons 23 and riveted, welded or bolted to the housing or tank 21 for supporting it with its axis in vertical position.

Each of the four legs 23 carries an outwardly projecting caster bracket 30, welded to the leg and having a vertical flange 31 for reinforcement and a horizontal flange 32 for caster support.

Caster brackets 30 are located upwardly, spaced from the bottom of the base 24, so that the caster supported wheels 22 hold the base 24 off the floor when the tires are inflated; but the base 24 may be permitted to rest in fixed position on the floor by deflating the tires.

The casters 33 are pivotally mounted on a horizontal caster plate 34 and have a ball bearing wheel 35, rotatably mounted on shaft 36, and provided with the inflatable tire 37. By attaching the casters to the frame above the base of the frame the stability of the assembly is increased, and by attaching the casters to outwardly extending brackets the stability is also improved.

Figure 1:
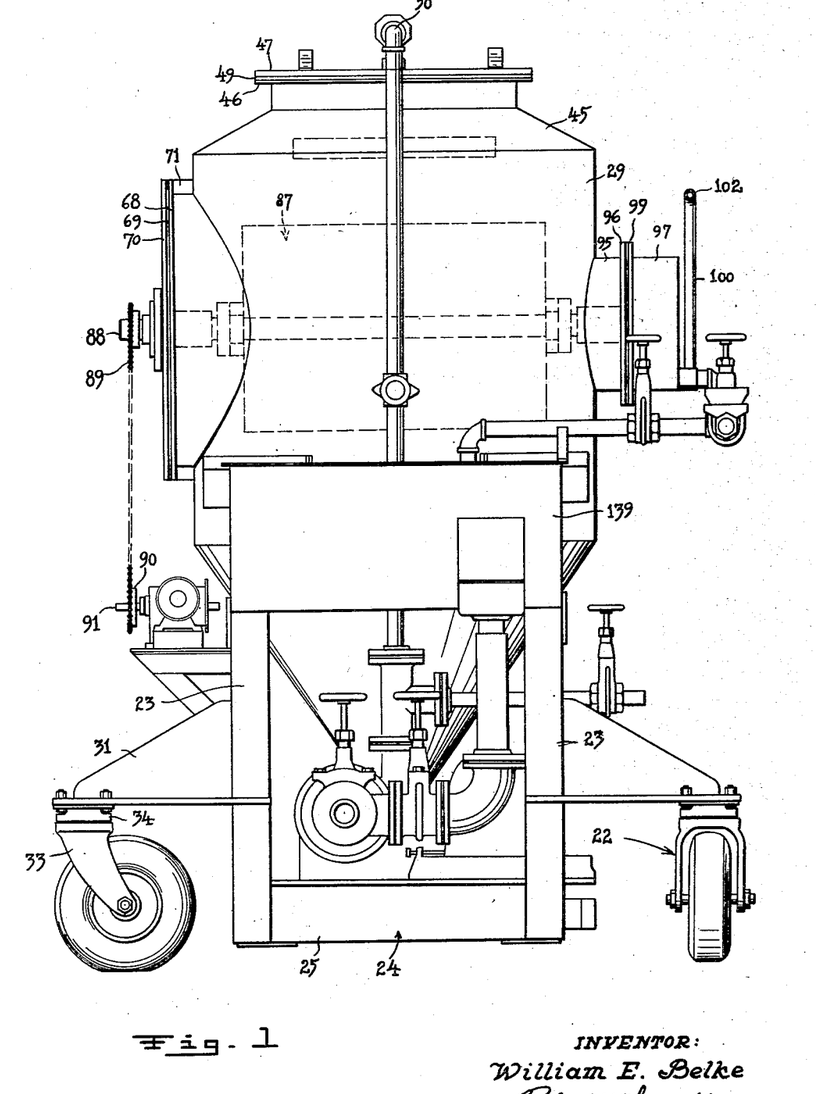
Fig. 1 is a rear elevational view of a filter embodying the invention.
Figure 2:
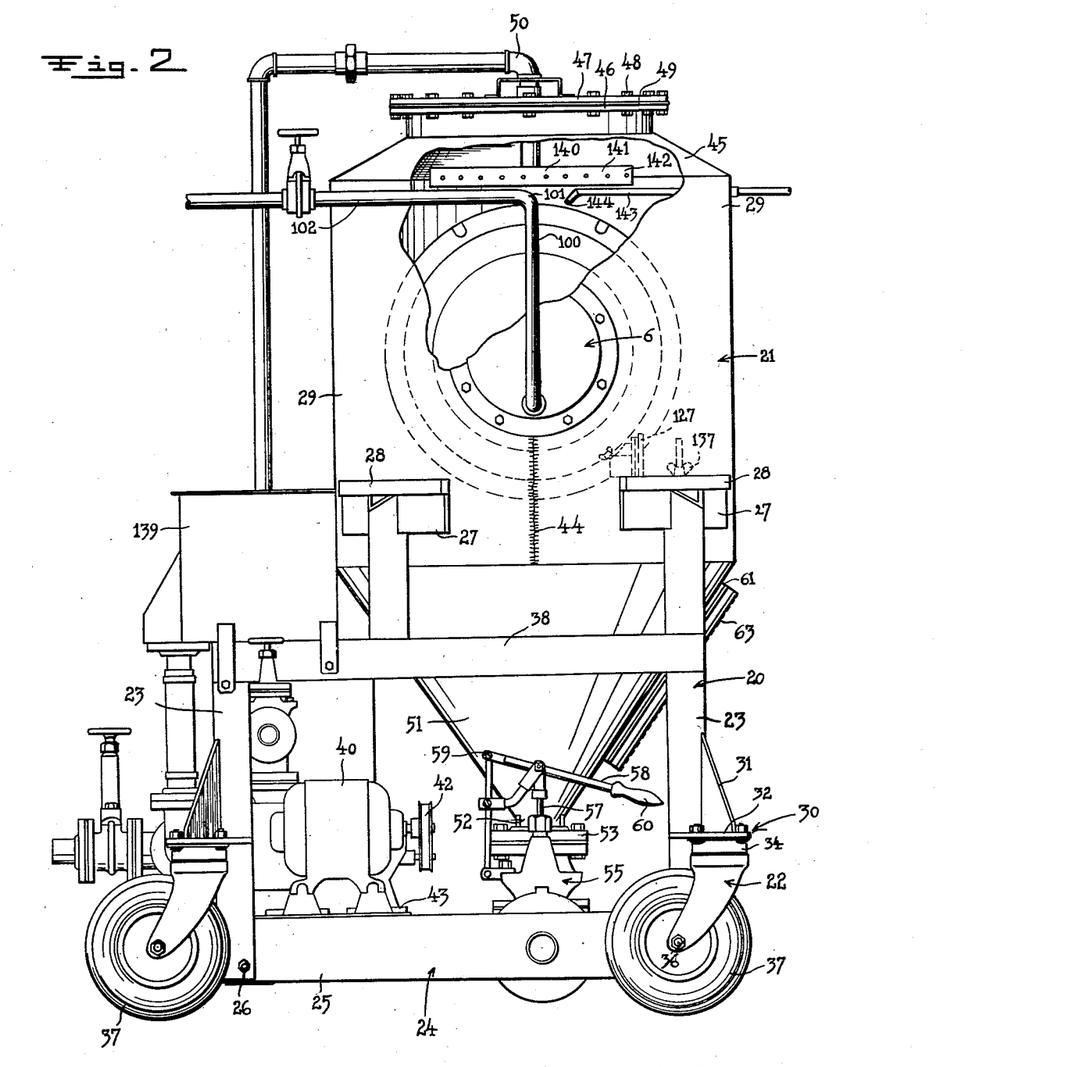
Fig. 2 is a side elevational view.
Figure 3:
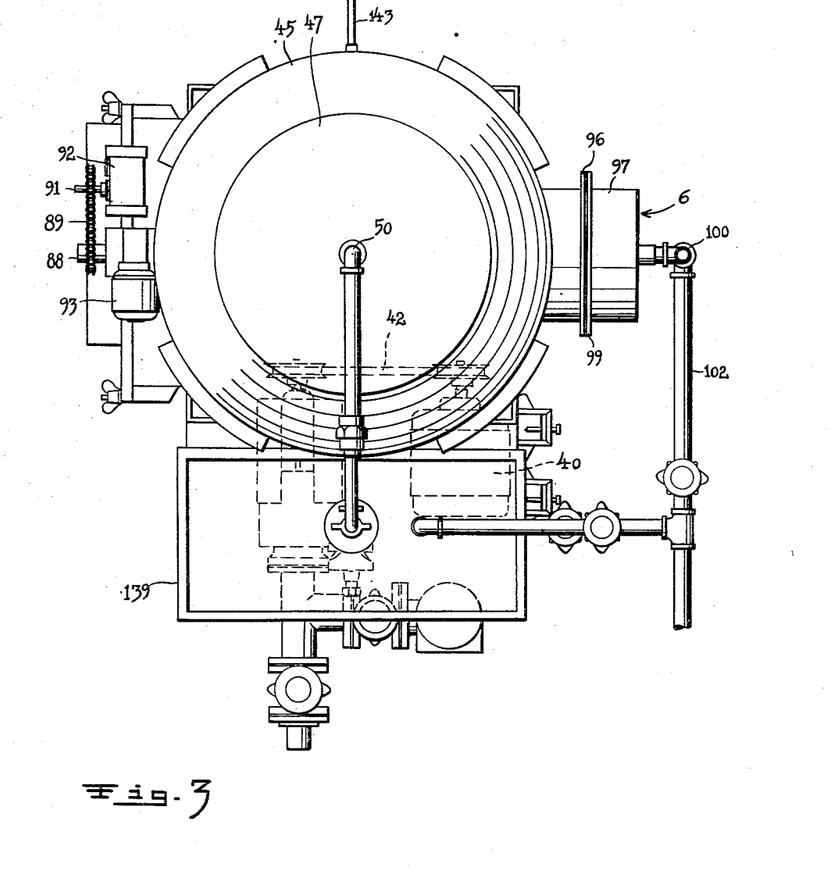
Fig. 3 is a top plan view.

The frame 20 preferably has an upper horizontal rectangular frame 38 which extends rearwardly, that is, to the left of Fig. 2, to provide space on the frame for supporting a tank 139, used for filter aid powder solution, and additional space for the motor 40 which drives compressor pump 41 by means of V pulleys and V belt 42.

A suitable platform 43 is mounted on the lower frame 24 for supporting these parts. The filter housing or filter tank 21 perferably comprises a substantially cylindrical, vertical tank, the side wall of which may be made of one or more sheets of suitble material bent to cylindrical form, with the abutting edges welded together as shown at 44.

Different materials may be used for different solutions; and the tank may be made out of steel lined with rubber or with a vitreous lining or it may be made out of "Lucite" or any other suitable material which will resist the action of the acids or electrolyte with which it is used. This also applies to every part of the filter with which the solution comes in contact.

At its upper end the cylindrical side wall 29 is welded to the larger end of a frusto-conical section 45, which is provided with a flange 46 at the top surrounding a top opening, which is closed with a cover 47 and secured by through bolts 48 with a liquid-tight gasket 49 between the cover and flange.

The cover carries the inlet pipe 50, passing through its center and adapted to carry the liquid to be filtered into the tank or housing 21. At its bottom the cylindrical side wall 29 is welded to a conical residue sump 51, which tapers to a central discharge opening 52, connected to a flanged pipe 53.

Pipe 53 communicates with elbow 54, which is connected to the gate valve 55, having a discharge pipe for residue. The gate valve 55 has an operating plunger 57 adapted to be operated by a force multiplying lever or handle 58, which is pivotally connected to the plunger and pivotally mounted at 59.

An upward pull on the handle 60 opens the gate valve 55 and permits the residue to be discharged under pressure from the outlet 56. The conical residue sump being tapered on its inside it gathers the residue and directs it toward the lower and smaller end 52 of the sump, where it is collected for discharge from the pipe 56.

The conical residue sump 51 preferably has a rectangular frame 61 welded to its side wall, the frame being elongated and surrounding an opening in the conical sump 51, which is rectangular and adapted to form a window.

The opening is closed by a glass cover 62, having gaskets on both sides engaging the frame 61 and engaging a clamping frame 63 to form a water tight window.

Figure 4:
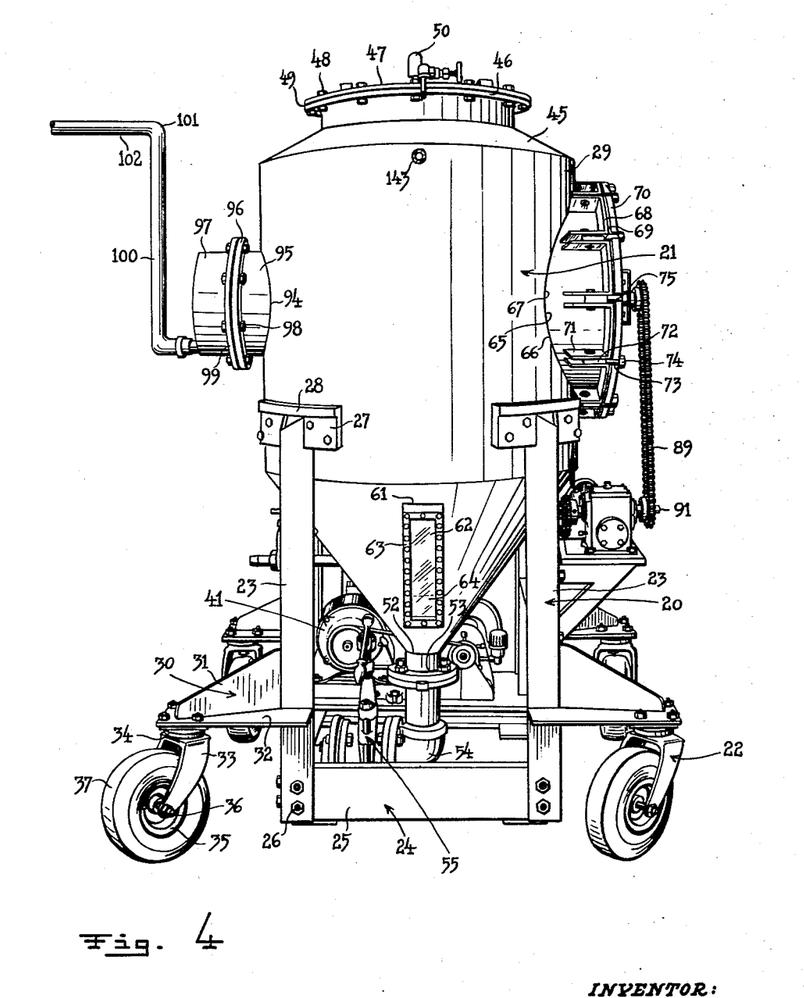
Fig. 4 is a front elevational view.
Figure 5:
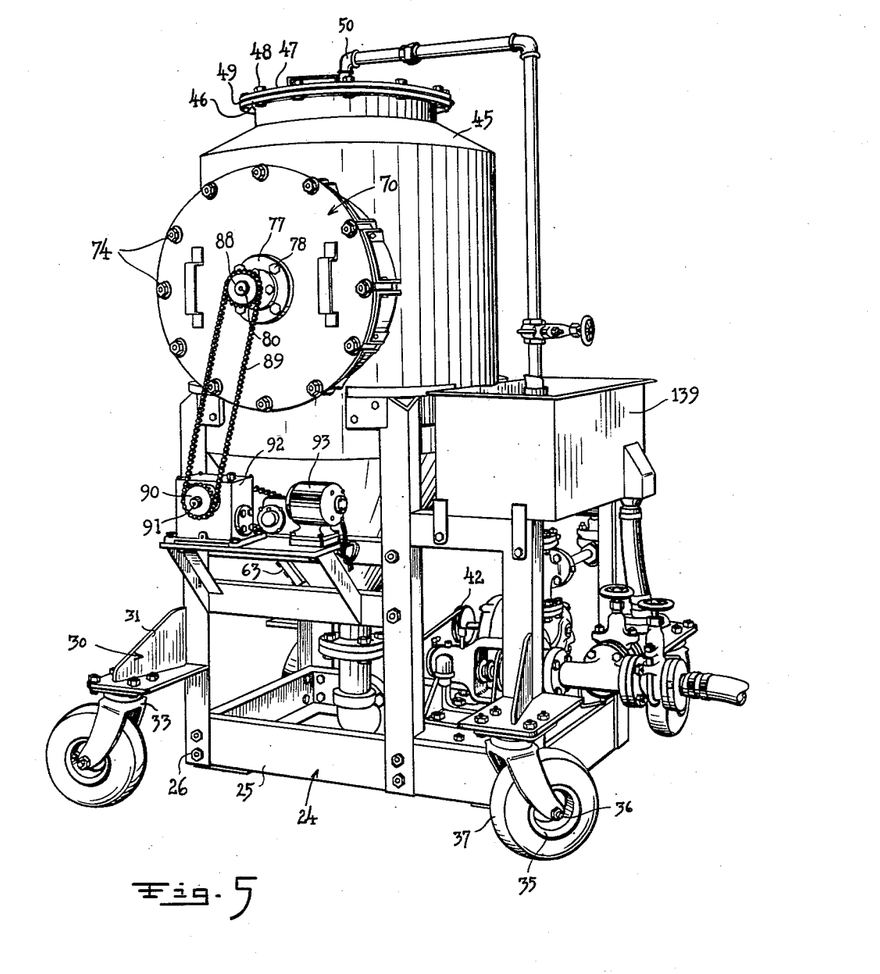
Fig. 5 is a perspective view of the side opposite to Fig. 2.

The amount of residue at any time may be observed through the window 62, as, for example, the residue 64, which is seen in Fig. 4.

The side wall 29 of the filter housing or tank 21 is provided with a lateral aperture 65, which may be circular and arranged to fit the rounded end 66 of a cylindrical frame member 67, which forms a lateral port provided with a flange 68, gasket 69 and circular cover 70.

Spaced ribs 71 are arranged on the outside of the frame 67 at regular intervals for pivotally supporting the blocks 72, which carry the threaded bolts 73, having washer and nuts 74 engaging the cover.

The cover has radial slots 75 for receiving the bolts 73, so that the bolts may be pivoted away from the cover out of the slots when the nuts are loosened and the cover is to be removed.

The cover 70 is provided with a central aperture 76, surrounded by a bearing flange 77 that is secured by bolts 78 on cover 70. Bearing flange 77 carries a bearing 79 for drum shaft 80, and the bearing is provided with a bore 81 for the shaft and a counterbore 82 for packing rings 83.

A gland 84 surrounds the shaft and has its flange 85 drawn inward by bolts 86, compressing the packing and maintaining it in water tight condition, so that the shaft 80 may rotate the drum 87 and may protrude from the filter housing without leakage.

The shaft 80 may carry a small sprocket wheel 88, having its hub keyed to the shaft and secured by a set screw, and the sprocket 88 is engaged by a link belt 89, which also engages sprocket 90, carried by the output shaft 91, of a reduction gear mechanism in housing 92.

The reduction mechanism is driven by the shaft of motor 93, and this mechanism is adapted to rotate the drum shaft at a slow speed, which may be varied by varying the size of the sprockets, depending on the amount of scraping required to scrape the residue from the drum. For example, in one embodiment of the invention the drum may rotate at ½ to 1 revolution per minute.

At its opposite side, Fig. 4, the filter housing 21 is provided with a smaller hole 94 in its side wall 29, welded to a short cylindrical frame 95, which is provided with a cover flange 96.

Aperture 65 for the right hand cover 70 is large enough to pass the cylinder 87, but the aperture 94 and frame 95 may be smaller since it serves for providing an outlet port.

The flange 96 is secured to a flanged cover 97 by means of bolts 98 passing through the flanges 96 and 99 and clamping a gasket.

An outlet pipe 100 extends from the interior of the cover 97 upward to a point 101, near the top of the housing 21, to provide the liquid outlet 102 at a high level so that liquid may be retained up to the level 101 in the housing 21, when the filter ceases operation, so that the cylinder 87 and its associated parts are still immersed in liquid, and the residue will not set or harden on the filter and its filter elements.

Of course the entire housing 21 may be emptied through the gate valve 55.

Figures 6, 7, 8, 9, 10, 11, 12:
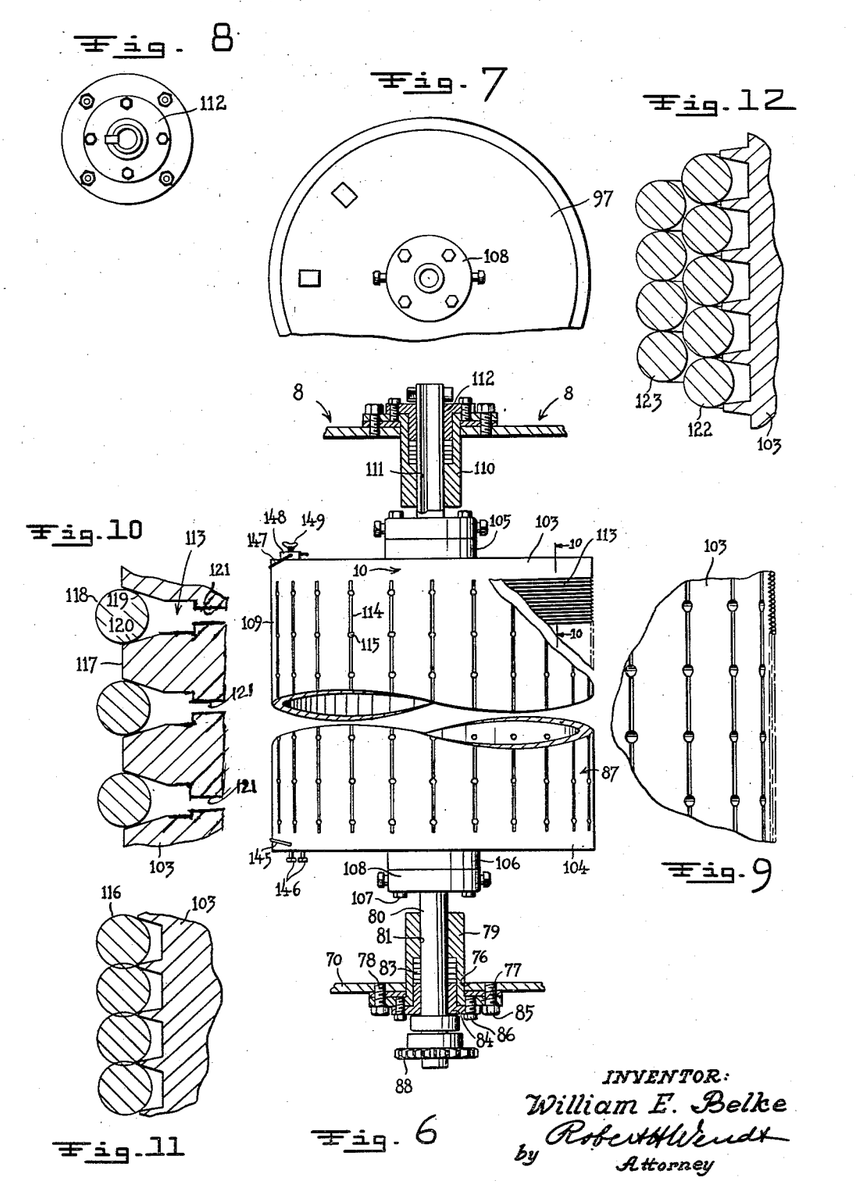
Fig. 6 is a fragmentary sectional view in partial elevation, showing the details of construction of the filtering drum and its supporting bearings.
Fig. 7 is a fragmentary end view of the drum.
Fig. 8 is a fragmentary sectional view taken on the plane of the line 8—8 of Fig. 6.
Fig. 9 is a fragmentary elevational view on a slightly larger scale, showing the construction of the drum.
Fig. 10 is a sectional view taken on the line 10—10 of Fig. 6, showing on a larger scale the shape of the filter element and its relation to the spiral grooves in which it is located.
Fig. 11 is a view similar to Fig. 10, showing another arrangement of grooves and filter element.
Fig. 12 is another view similar to Fig. 10, showing a modification of the arrangement of the filter elements.

Referring to Fig. 6, the cylinder 87 may comprise a cylindrical member of metal or of a suitable plastic which is resistant to chemical action of the electrolyte, such as the plastic known as "Lucite," the chemical name of which is arcrylcite plastic.

This cylinder 87 is provided with relatively thick end walls 103 and 104, each having a hub 105, 106 centrally attached to its end and secured by screw bolts 107 to a circular flange 108 located on each shaft.

The side wall 109 of the cylinder is preferably thinner and is integrally welded to the end walls 103, 104. The cylinder is provided with a second shaft 110 on its opposite end, which is provided with a through bore 111, serving as a discharge conduit from the interior of the cylinder; and the shaft 110 is rotatably mounted in a bearing 112, which need not be packed against leakage, since the conduit 111 discharges into the fixed cover 97.

The cylinder 87 has its side wall 109 provided with one or more spiral grooves 113, which extend about the cylinder and cover its side wall from end to end.

Like any spiral thread the grooves may include one spiral or two or three or more; but a single spiral enables the filling of the groove with a single filter element, which need only be secured at both its ends.

When the spiral grooves of Fig. 11 or 12 are used, the cylinder also has the longitudinally extending parallel grooves 114, connecting the spirals and provided with through apertures 115 leading to the interior of the cylinder.

The grooves may in some cases be close enough together, as shown in Fig. 11, to permit the round filter elements 116 of string or cord to engage each other as well as engaging the walls of the groove, thereby presenting a continuous surface of filter material, as shown in Fig. 11.

The grooves 113 may be spaced from each other, as shown in Fig. 10, leaving lands 117 between them and presenting separate spiral turns of the filter element 118.

The size of the groove relative to the filter element 118 is such that the filter element 118 is pressed downward between the tapered walls 119, 120 to such tight fit that liquid cannot flow between the wall and the filter element and must pass through the filter element.

Each groove 113 communicates with plural apertures 121, which conduct the filtrate to the inside of the cylinder. In the preferred modification of Fig. 10 the parallel grooves 114 and holes 115 are omitted.

In some embodiments of the invention, as shown in Fig. 12, the closely arranged grooves of Fig. 11 may have a base layer of filter elements 122 and a second layer 123 of overlapping filter elements.

Figures 13, 16:
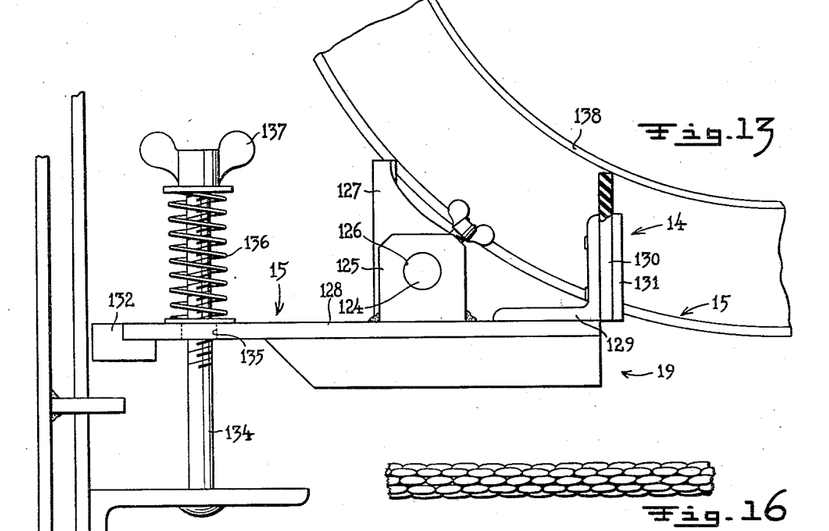
Fig. 13 is a fragmentary end view of a part of the drum and the scraper arrangement for scraping the residue from the drum.
Fig. 16 is a fragmentary side elevational view of one form of fibrous, woven cord used for a filter element.
Figure 17:
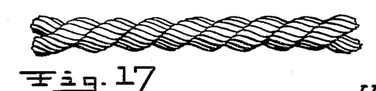
Fig. 17 is a similar view of a twisted fibrous or stranded string used as a filter element.

Referring to Figs. 16 and 17, these are illustrations of various types of fibrous or stranded filter elements that may be arranged in the grooves.

Fig. 16 shows a woven fibrous cord on an enlarged scale which may be tightly woven or loosely woven to permit more liquid to pass.

Fig. 17 shows a twisted fibrous or stranded filter element twisted like a string and shown on an enlarged scale. The twist tightness and the tension on the string or cord has an effect in providing a tight or a loose filter.

These filters may be made of cotton, but may also be made of various plastic fibers, such as nylon, spun glass, etc. and in any case will be of suitable fibrous structure adapted to resist destruction by the acids or solutions they are intended to filter. In some cases fine wires may be twisted together and made of suitable corrosion resisting metal.

The filter elements 118 in the spiral groove 113 is secured at one end of the cylinder 87 by passing it in a diagonal aperture 145 in the end wall and being engaged by the set screws 146.

At the other end the filter element may pass into a diagonal aperture 147 in a "Lucite" block 148, where it is secured by a plurality of clamping screws 149.

Figure 14:
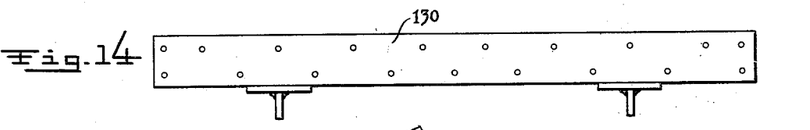
Fig. 14 is a fragmentary elevational view of element 14 in Fig. 13, showing the construction of the scraper blade.
Figure 15:
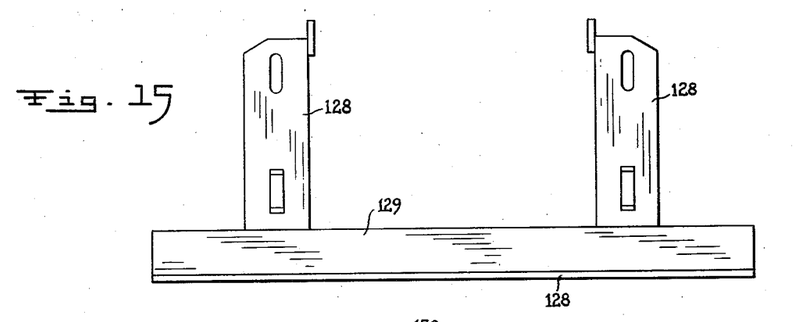
Fig. 15 is a fragmentary elevational view of element 15 in Fig. 13, showing a top plan of the scraper support.

Referring to Figs. 13–15, these are views showing the structures of the scraper. The end walls of the housing support suitable stub shafts 124 for pivotally mounting a pair of pivot blocks 125 having apertures 126. The stub shafts may be carried by brackets 127. The pivot block 125 is carried by a transverse arm 128, which is provided at its end with an elongated angle iron 129, having a blade of soft or rigid hard rubber, Bakelite or other suitable materials secured to it by through bolts and a clamping plate 131.

The blade 130 engages the cylinder with its filter elements and continuously scrapes the cylinder clean of residue which drops to the bottom of the container.

The two arms 128 extend backwardly to the side of the container where they engage a pair of fixed stops 132, limiting the movement of the blade toward the cylinder and preventing it from pressing too hard or too close to the cylinder.

A pair of angle brackets 133 carry fixed screw bolts 134, which pass through enlarged apertures 135 in the arms 128, and are provided with compression springs 136, engaged by washers and wing nuts 137 on the threaded ends of the bolts 134.

The pressure of the springs 136 is therefore adjustable and the springs urge the scraper blade 130 toward the cylinder limited by the stops 132 to a definite level so that filter aid is scraped off above a certain level.

Another method of maintaining a certain level of filter aid on the cylinder is to provide a pair of stop rings 138 on the cylinder engaging below the blade 130, and limiting its approach toward the cylinder.

The machine is preferably provided with an auxiliary tank 139 for receiving a supply of filter aid which can be pumped into the housing 21 and spread on the cylinder as it rotates by the liquid passing through and into the cylinder.

The inlet pipe 50 preferably terminates in a distributor head 140 which is perforated at 141, at a cross head 142, for distributing the material to be filtered uniformly over the top of the cylinder.

The housing is also preferably provided with an inwardly extending valved pipe 143, having a multiplicity of downwardly extending nozzles 144 for hosing off the cylinder to clean it by means of the jet action of water.

Either a multiplicity of nozzles 144 may be provided or a single nozzle arranged to reciprocate back and forth from one end to the other as the cylinder rotates.

The operation of the filter is as follows:

The liquid to be filtered passes in at the top of the filter housing which is completely filled with liquid under pressure, the pressure being generated by the pump, which, for example, in one embodiment is operated at a pressure of fifty-five pounds per square inch.

The filter housing must be primed with liquid and the air must be bled off the top and a layer of filter aid powder may, if desired, be fed into the housing and distributed uniformly in a light coating over the cylinder up to the level of the scraper.

The filter cylinder then rotates at a uniform low speed, such as one-half to one revolution per minute; and the liquid to be filtered passes in at the top through the filter elements into the cylinder and out at the side.

The residue gathers on the cylinder and is scraped off; and being heavier than the liquid, it settles to the bottom of the filter housing in the residue sump, where it can be seen in the window.

The bottom valve is opened whenever it is desired to discharge a supply of residue and the filter operates substantially continuously.

From time to time the filter may be cleaned at long intervals by means of the jet nozzle or by reversing the flow; but it is unnecessary to stop the filter to clean it daily, as in the case of the prior electrolyte filters.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A continuous filter for electrolyte or the like comprising, a metal housing having a tapered bottom for receiving sediment, ending in a discharge opening provided with a valve, the said housing being provided at its top with an inlet for liquid, and means for distributing the liquid over the area of the housing at the top, a cylinder rotatably mounted in said housing and provided with a spiral peripheral groove, the side walls of which taper inwardly, said groove having a plurality of apertures along its length extending to the interior of said cylinder, and a spirally wrapped, twisted, fibrous string in said spiral groove, secured at both ends and wedged tightly into said groove to prevent the passage of liquid between the edges of the string and the walls of the groove, the said cylinder having an outlet at one end for passing filtered liquid and the solids remaining on the exterior of said cylinder and string, the said housing being provided with bearings and said cylinder being provided with trunnions in said bearings, one of said trunnions being hollow and having its end opening into a cap provided with a discharge opening, eliminating the necessity for packing a rotating bearing.

2. A continuous filter for electrolyte or the like comprising, a metal housing having a tapered bottom for receiving sediment, ending in a discharge opening provided with a valve, the said housing being provided at its top with an inlet for liquid, and means for distributing the liquid over the area of the housing at the top, a cylinder rotatably mounted in said housing and provided with a spiral peripheral groove, the side walls of which taper inwardly, said groove having a plurality of apertures along its length extending to the interior of said cylinder, and a spirally wrapped, twisted, fibrous string in said spiral groove, secured at both ends and wedged tightly into said groove to prevent the passage of liquid between the edges of the string and the walls of the groove, the said cylinder having an outlet at one end for passing filtered liquid and the solids remaining on the exterior of said cylinder and string, the said cylinder being provided with end trunnions and said housing having a packed bearing for one of said trunnions and operative mechanical driving means for driving said latter trunnion to cause the cylinder to rotate at a uniform speed.

3. A continuous filter for electrolyte or the like comprising, a metal housing having a tapered bottom for receiving sediment, ending in a discharge opening provided with a valve, the said housing being provided at its top with an inlet for liquid, and means for distributing the liquid over the area of the housing at the top, a cylinder rotatably mounted in said housing and provided with a spiral peripheral groove, the side walls of which taper inwardly, said groove having a plurality of apertures along its length extending to the interior of said cylinder, and a spirally wrapped, twisted, fibrous string in said spiral groove, secured at both ends and wedged tightly into said groove to prevent the passage of liquid between the edges of the string and the walls of the groove, the said cylinder having an outlet at one end for passing filtered liquid and the solids remaining on the exterior of said cylinder and string, and means for rotating the cylinder and scraping means engaging the periphery of said cylinder and continuously scraping the residue from the cylinder to permit it to settle to the bottom of said housing.

4. A continuous filter for electrolyte or the like comprising, a metal housing having a tapered bottom for receiving sediment, ending in a discharge opening provided with a valve, the said housing being provided at its top with an inlet for liquid, and means for distributing the liquid over the area of the housing at the top, a cylinder rotatably mounted in said housing and provided with a spiral peripheral groove, the side walls of which taper inwardly, said groove having a plurality of apertures along its length extending to the interior of said cylinder, and a spirally wrapped, twisted, fibrous string in said spiral groove secured at both ends and wedged tightly into said groove to prevent the passage of liquid between the edges of the string and the walls of the groove, the said cylinder having an outlet at one end for passing filtered liquid and the solids remaining on the exterior of said cylinder and string, and means for rotating the cylinder and scraping means engaging the periphery of said cylinder and continuously scraping the residue from the cylinder to permit it to settle to the bottom of said housing, said scraping means comprising a frame member extending longitudinally of said cylinder and having a rigid scraping member carried thereby for engaging the cylinder, the said rigid scraping member extending toward said cylinder and being backwardly turned to trail in the direction of movement of the cylinder while pressing against the strings on the cylinder, and means for pivoting said frame member on an axis extending parallel to the axis of the cylinder and spring means for urging the scraping member into engagement with said cylinder.

5. In a continuous filter for electrolyte, the combination of a substantially cylindrical metal housing provided with a tapered lower end leading to a discharge opening, said discharge opening being flanged and provided with a gate valve, a force multiplying lever mounted on said housing and connected to said gate valve to actuate the valve at will, said housing having a frame for supporting it in substantially vertical position and being provided at its top with a flanged opening and a cover clamped over said opening with liquid tight sealing means, said cover having an inlet pipe for electrolyte to be filtered, said housing being provided with a pair of lateral circular openings and one of said openings being provided with a cover having a packed bearing, the other opening having a frame supporting a bearing and a liquid tight cap enclosing said bearing and forming a chamber separate from the housing, a hollow cylinder having a trunnion projecting from the first-mentioned bearing and having a hollow outlet trunnion extending through the second-mentioned bearing into said cap, an outlet for filtrate extending from said cap, the said cylinder having a spirally extending groove on its periphery, said groove being provided with a multiplicity of through apertures leading to the interior of the cylinder, and a filter element wound in said groove and closing said through apertures, the said spiral groove being provided with inwardly tapered side walls and said filter element being tightly wedged in said groove by tension applied to its ends in wrapping the filter element and by shrinkage, preventing the liquid from passing between the filter element and the walls of the groove and causing the liquid to pass through the filter element, the said filter element comprising a twisted string of fibrous material suitable for withstanding the chemical action of the electrolyte, and a scraper bar provided with a rigid scraper element engaging the filter element and extending parallel to the axis of the cylinder, said scraper bar being pivotally mounted and having spring means for urging it toward said cylinder.

6. A continuous filter for electrolyte comprising a metal housing having a tapered bottom tapering toward a discharge port having a gate valve, the said housing being substantially cylindrical, and having an upper closure plate and having a pair of diametrically opposite, lateral, cylindrical extensions, each extension being provided with a cover plate, one of said extensions being provided with a packed bearing, and having a shaft projecting therethrough, and drive means for rotating said shaft at a slow rate of speed, the other of said extensions supporting a bearing for a hollow trunnion, open at its outer end, located spaced from the closure plate, said closure plate having an outlet pipe connected thereto, a cylinder carried by said shaft and rotatable therewith, the said cylinder being provided with a spirally extending groove, the said groove being tapered inwardly, and having multiplicity of discharge apertures extending from the said grooves into said cylinder and through said hollow trunnion to said discharge pipe, the said grooves being tightly filled by a spirally extending fibrous cord wedged inwardly in said tapered groove and preventing the liquid from passing between the fibrous cord and the walls of the groove, and a trailing scraper blade resiliently pressed against said cord and dislodging the residue which falls into said tapered lowered end, to be discharged through said gate valve.

References Cited in the file of this patent

UNITED STATES PATENTS

| 1,253,162 | Faber | Jan. 8, 1918 |
| 1,856,452 | Armstrong | May 3, 1932 |
| 2,035,851 | Walker | Mar. 31, 1936 |
| 2,460,280 | Finney | Feb. 1, 1949 |
| 2,655,265 | Little | Oct. 13, 1953 |
| 2,703,177 | Kunstorff | Mar. 1, 1955 |

FOREIGN PATENTS

| 265,856 | Great Britain | Feb. 17, 1927 |
| 416,097 | Great Britain | Sept. 13, 1934 |